United States Patent Office 3,207,664
Patented Sept. 21, 1965

3,207,664
HEPARIN DERIVATIVES AND METHOD OF PREPARING SAME
Gerard Nomine, Noisy-le-Sec, and Robert Bucourt, Clichy-sous-Bois, France, assignors to Roussel-UCLAF, S.A., Paris, France, a corporation of France
No Drawing. Filed July 24, 1963, Ser. No. 297,216
Claims priority, application France, Aug. 6, 1962, 906,181
13 Claims. (Cl. 167—74)

The invention relates to the novel heparin derivatives, O-acetyl-N-(3,5-dimethylbenzoyl)-heparamine and its alkali metal salts, and to a novel process for the preparation of the said novel derivatives. The invention also relates to novel compositions for treating hyperlipemia and to a novel method of treating hyperlipemia.

Heparin is known to possess a clarifying action on hyperlipemic serum but it also has a very high anticoagulant activity which controverts its use for combatting hypercholesterolemia. Recently certain derivatives of heparin, particularly certain N-acyl-heparamines have been produced which have an antilipemic activity with little or no anticoagulant activity. However, the usefulness of these products have been limited or at least rendered difficult by the fact that they are not effective when taken orally but must be administered parenterally. The compounds of the invention have the advantage that they can be administered orally as well as by other methods of administration.

It is an object of the invention to provide the novel products, O-acetyl-N-(3,5-dimethylbenzoyl)-heparamine and its alkali metal salts.

It is another object of the invention to provide a novel process for the preparation of O-acetyl-N-(3,5-dimethylbenzoyl)-heparamine and its alkali metal salts.

It is an additional object of the invention to provide novel antilipemic compositions.

It is a further object of the invention to provide a novel method of treating hyperlipemia.

These and other objects and advantages of the invention will become obvious from the following detailed description.

The novel compounds of the invention are O-acetyl-N-(3,5-dimethylbenzoyl)-heparamine having an acetylation value of 70 to 100% and its alkali metal salts. Another way of naming the heparamine compound is O-acetyl - N-(3,5-dimethylbenzoyl)-N - desulfoheparin. The compounds of the invention possess a good antilipemic or clarifying action and a negligible anticoagulant activity and are useful in the treatment or chromic or post-prandial hyperlipemia.

The process of the invention for the preparation of O-acetyl-N-(3,5-dimethylbenzoyl)-heparamine comprises reacting the sodium salt of N-(3,5-dimethylbenzoyl)-heparamine with acetic acid anhydride in a mixture of pyridine and formamide at or about room temperatures, adding a water-miscible solvent, such as ethanol or acetone thereto to precipitate the sodium salt of O-acetyl-N-(3,5-dimethylbenzoyl)-heparamine having an acetylation value of 70 to 100% and transforming the said sodium salt into the free acid form of O-acetyl-N-(3,5-dimethylbenzoyl)-heparamine which can be transformed into its other alkali metal salts by reaction with a desired alkali metal base.

It is preferred to use a large excess of acetic acid anhydride on the order of 10 to 15 times the theoretical amount. Advantageously, equal volumes of acetic acid anhydride, pyridine and formamide are used. The degree of acetylation will vary according to the length of reaction time, amounts of reactants, etc. but usually varies between 80 to 100%, and 95 to 100% under the preferred conditions.

The novel antilipemic compositions of the invention are comprised of a member selected from the grouping consisting of O-acetyl-N-(3,5-dimethylbenzoyl)-heparamine having an acetylation value of 70 to 100% and its alkali metal salts and a major amount of a pharmacological carrier. The compositions can be prepared in the form of injectable solutions and of injectable suspensions, prepared in ampules and in multiple dose flacons, syringes ready for injection, in the form of sugar coated tablets and of glossettes and in the form of suppositories in the usual fashion.

The method of the invention for treating hyperlipemia comprises administering an effective amount of a member selected from the group consisting of O-acetyl-N-(3,5-dimethylbenzoyl)-heparamine having an acetylation value of 70 to 100% and its alkali metal salts. The said compounds can be administered orally, perlingually, transcutaneously or rectally. The usual useful dosages are 20 to 50 mg. per dose and a daily dose of 50 to 100 mg. depending upon the method of administration.

In the following examples there are described several preferred embodiments to illustrate the invention. However, it is to be understood that the invention is not intended to be limited to the specific embodiments.

EXAMPLE I

Preparation of the sodium salt of O-acetyl-N-(3,5-dimethylbenzoyl)-heparamine 0.5 gm. of the sodium salt of N-(3,5-dimethylbenzoyl)-heparamine, prepared according to the procedure of U.S. Patent No. 3,065,140, was introduced into 6 cc. of formamide under agitation. 6 cc. of pyridine were added, and then 6 cc. of acetic acid anhydride were added very slowly over a period of an hour and a half. The agitation of the reaction mixture under an atmosphere of nitrogen was continued for a period of 24 hours. Then alcohol was added thereto and the precipitate formed was vacuum filtered, washed with alcohol and with ether and dried over phosphoric anhydride to obtain 0.435 g. (being a yield of 76%) of the sodium salt of O-acetyl-N-(3,5-dimethylbenzoyl)-heparamine.

Analysis for an octacyclic unit $(C_{102}H_{115}O_{74}N_4S_7Na_{11})$: Molecular weight=3058.4. Calculated: S, 7.34%;  17.65%. Found: S, 7.2–7.5%; $CH_3COOH$, 16.8%.

The product thus had an acetylation value of 95%. Its clarifying power corresponded to 100 antilipemic units per mg. being 66% of the clarifying power of standard heparin. The antilipemic unit is defined by Plotka et al., Arch. Int. Pharmacodyn., 1960, 126, 143. Its anticoagulant activity is 3.75 USP units per mg.

The said product was a solid of whitish color whose degree of solvatation was between 6 and 10%. It was slightly soluble in alcohol, insoluble in the usual organic solvents, such as ether, acetone, benzene and chloroform and soluble in methanol and in 10 volumes of water.

This compound is not described in the literature.

EXAMPLE II

Preparation of O-acetyl-N-(3,5-dimethylbenzoyl)-heparamine in its acid form 0.2 gm. of the sodium salt of O-acetyl-N-(3,5-dimethylbenzoyl)-heparamine, produced in Example I, was dissolved in 2 cc. of water and the aqueous solution was passed through an ion exchange column of Dowex 50 (sulfonated copolymer of styrene and divinyl benezene) to obtain an aqueous solution of O-acetyl-N-(3,5-dimethylbenzoyl)-heparamine in its acid form. The said compound in its acid form could not be recovered from the aqueous solution.

The aqueous solution of O-acetyl-N-(3,5-dimethylbenzoyl)-heparamine in its acid form was neutralized with potassium hydroxide to a pH of 8 to 10. Upon the addition of a water-miscible solvent, such as ethanol or acetone, the potassium salt of O-acetyl-N-(3,5-dimethylbenzoyl)-heparamine precipitated. The said potassium salt was washed with ethanol and then with ether and dried over phosphoric acid anhydride.

In an analogous fashion, other alkali metal salts of O-acetyl - N - (3,5-dimethylbenzoyl) - heparamine can be formed.

PHARMACOLOGICAL STUDY

A. *Determination of the immediate anticoagulant activity "in vitro"*

(a) ANTI-THROMBIC ACTIVITY

The anticoagulant activity "in vitro" of the sodium salt of O-acetyl - N - (3,5-dimethylbenzoyl) - heparamine prepared in Example I was determined by the method of Herbain (Bull. Soc. Chim. Biol., vol. 40, 1958, p. 1221). A test plasma deprived of calcium and prothrombine was prepared and when thrombin was added to the plasma the fibrinogen in the plasma was converted to fibrin which produced a simultaneous coagulation and an opacification. The previous addition to the plasma of an anticoagulant such as heparine retards the coagulation and opacification and the time necessary to obtain a given value of opacification is a measure of the anticoagulant activity of the test compound. The sodium salt of the invention was compared with a standard solution of heparin and the values were expressed arbitrarily in anti-thrombic units (ATU). The standard heparin had a value of 130 to 140 ATU/mg. while the sodium salt of O-acetyl-N-(3,5-dimethylbenzoyl)-heparamine had a value of 13 ATU/mg.

(b) METHOD OF AMERICAN PHARMACOPOEIA (USP XV)

In this method, the immediate anticoagulant activity "in vitro" of standard heparin and the sodium salt of O-acetyl-N-(3,5-dimethylbenzoyl)-heparamine were compared. The standard heparin had a value of 130–140 IU/mg. (international units) while the sodium salt of the invention had a value of 3.75 IU/mg.

The two tests clearly show that the anticoagulant activity of the compounds of the invention is practically negligible.

B. *Determination of antilipemic activity*

(a) ANTILIPEMIC ACTIVITY ON POST-PRANDIAL LIPEMIA OF DOGS (1) *After administration by venous administration.*—An experimental hyperlipemia was produced in dogs by ingestion of 10 g. per kg. of fresh cream containing 38% fatty matter. Four hours and a half after this lipidic excess, the dogs were divided into three lots. One lot served as the control, one lot received intravenously a dose of 50 γ/kg. of the sodium salt of O-acetyl-N-(3,5-dimethylbenzoyl)-heparamine previously dissolved in physiological serum at a concentration of 500 γ/cc. and one lot received a dose of 100 γ/kg. of the said salt under the same conditions. Samples of the blood were taken from all of the animals four and a half hours after ingestion of the fresh cream which was immediately before the administration of the product and ten, twenty, thirty, and sixty minutes thereafter.

The samples of the blood (3 cc.) were recovered on an anticoagulant agent and then were centrifuged. The plasma was separated and the plasmatic turbidity thereof was determined photometrically by Vernes process and expressed in optic densities permitting the following of the evolution of the lipemia. The results obtained with the three lots of dogs are summarized in Table I.

TABLE I

| Doses of the sodium salt of O-acetyl-N-(3, 5-dimethylbenzoyl)-heparamine | Plasmatic Turbidity | | | | |
|---|---|---|---|---|---|
| | 4½ hours after ingestion of cream | 10 min. after | 20 min. after | 30 min. after | 60 min. after |
| 0 | 0.95 | 1 | 1.10 | 1.20 | 1.10 |
| 50 γ/kg | 0.95 | 0.525 | 0.675 | 0.86 | 1.05 |
| 100 γ/kg | 1.04 | 0.70 | 0.86 | 0.75 | 0.97 |

(2) *After administration of the medicine orally.*—A lipidic excess was caused in dogs by ingestion of fresh cream under the same conditions as in Test 1. One lot of dogs received only the fresh cream while the other lots of even number received orally 2 mg./kg. and 5 mg./kg. doses of the sodium salt of O-acetyl-N-(3,5-dimethylbenzoyl)-heparamine in solution in physiological serum mixed with the cream. Just before the administration of the fresh cream, 3 cc. of blood from each dog was recovered on an anticoagulant agent. In addition, three, five and seven hours after the administration of the fresh cream, blood was separated from the dogs under the same conditions. The plasmatic turbidity of the plasma samples was determined photometrically as before and the results are summarized in Table II.

TABLE II

| Doses of the sodium salt of O-acetyl-N-(3, 5-dimethylbenzoyl)-heparamine | Plasmatic Turbidity | | | |
|---|---|---|---|---|
| | Time after ingestion of cream | | | |
| | 0 hours | 3 hours | 5 hours | 7 hours |
| 0 | 0.15 | 0.95 | 0.90 | 0.33 |
| 2 mg./kg | 0.17 | 0.54 | 0.38 | 0.22 |
| 5 mg./kg | 0.13 | 0.50 | 0.48 | 0.20 |

The data in Table II show that a clear antilipemic effect was obtained at a dose of 2 mg./kg. of the sodium salt of O-acetyl-N-(3,5-dimethylbenzoyl)-heparamine.

(b) ANTILIPEMIC ACTIVITY ON LIPEMIA IN RATS

Two homogenous lots of old male rats weighing about 350 gm. were starved for a period of 48 hours. Then 1 cc./100 g. of a fine emulsion of corn oil (Lipomul) was administered orally to each rat to surcharge them in lipides. Each rat of the control group received 0.2 cc. of physiological serum with the corn oil while each rat of the second group received 0.2 cc. of the physiological serum containing 5 mg. of the sodium salt of O-acetyl-N-(3,5-dimethylbenzoyl)-heparamine. Sixteen hours after the ingestion of the corn oil, the rats were sacrificed by puncture of the carotid and the blood was recovered on an anticoagulant agent and centrifuged. The plasma was separated and its turbidity was determined photometrically as in Tests 1 and 2. The Burstein test (Presse. Med., vol. 66, 1958, p. 974) and the Kunkel test (Gastroenterology, vol. 11, 1948, p. 499) were also conducted on the plasma. The results are summarized in Table III.

TABLE III

| Test | Control Lot | Treated Lot | Percent Reduction In Treated Lot Compared To Control Lot |
|---|---|---|---|
| Plasmatic Turbidity | 0.67 | 0.28 | −58 |
| Burstein Test | 0.435 | 0.315 | −28 |
| Kunkel Test | 0.905 | 0.705 | −22 |

The results of the tests in this section clearly demonstrate the efficiency of the sodium salt of O-acetyl-N-(3.5-dimethylbenzoyl)-heparamine on post-prandial lipemia when administered orally.

C. Determination of acute toxicity

The acute toxicity of the sodium salt of O-acetyl-N-(3,5-dimethylbenzoyl)-heparamine was determined by administering orally 500 mg./kg. of the said sodium salt in solution in physiological serum at a concentration of 20 mg./cc. to a lot of mice of the Rockland strain weighing between 18 and 22 gm. The animals were maintained under observation for a week during which no mortality of symptoms of intoxication were observed.

Another test of the acute toxicity of the sodium salt of O-acetyl-N-(3,5-dimethylbenzoyl)-heparamine was conducted by administering intravenously 0.2 cc. of the said solution of the sodium salt (200 mg./kg.) to another lot of Rockland mice. After a week's observation, no mortality or symptoms of intoxication were noted and the animals after they had been sacrificed showed no internal hemorrhagic plates.

D. Local tolerance

The test consisted of injecting 0.1 cc. of sterile physiological solutions of 2 mg./cc., 5 mg./cc., 10 m./cc. and 20 mg./cc. of the sodium salt of O-acetyl-N-(3,5-dimethylbenzoyl)-heparamine under the plantar aponevrose of the hindpaw of rats. The inflammatory effect of the sodium salt was determined by comparing the circumferences of the treated paw and the untreated paw three hours after the injections. None of the injections caused a significant increase in the circumference of the treated paw.

Various modifications of the process and compositions of the invention may be made without departing from the spirit or scope thereof, and it is to be understood that the invention is intended to be limited only as defined in the appended claims.

We claim:

1. A compound selected from the group consisting of O-acetyl-N-(3,5-dimethylbenzoyl)-heparamine having an acetylation value of 70 to 100% and its alkali metal salts.

2. O-acetyl-N-(3,5-dimethylbenzoyl)-heparamine having an acetylation value of 70 to 100%.

3. The sodium salt of O-acetyl-N-(3,5-dimethylbenzoyl)-heparamine having an acetylation value of 70 to 100%.

4. The potassium salt of O-acetyl-N-(3,5-dimethylbenzoyl)-heparamine having an acetylation value of 70 to 100%.

5. A process for the preparation of the sodium salt of O-acetyl-N-(3,5-dimethylbenzoyl)-heparamine having an acetylation value of 70 to 100% which comprises reacting the sodium salt of N-(3,5-dimethylbenzoyl)-heparamine with acetic acid anhydride in a pyridine media to form a solution of the sodium salt of O-acetyl-N-(3,5-dimethylbenzoyl)-heparamine having an acetylation value of 70 to 100%, adding a water-miscible solvent to the solution to precipitate the said sodium salt and recovering the said sodium salt.

6. The process of claim 5 wherein the acetylation is effected with equal volumes of acetic acid anhydride, pyridine and formamide with the acetic acid anhydride being in excess of the theoretical amounts.

7. The process of claim 5 wherein the water-miscible solvent is ethanol.

8. A process for the preparation of O-acetyl-N-(3,5-dimethylbenzoyl)-heparamine having an acetylation value of 70 to 100% which comprises reacting the sodium salt of N-(3,5-dimethylbenzoyl)-heparamine with an excess of acetic acid anhydride in a pyridine media to form a solution of the sodium salt of O-acetyl-N-(3,5-dimethylbenzoyl)-heparamine having an acetylation value of 70 to 100%, adding ethanol to the said solution to precipitate the said sodium salt, dissolving the latter in water and acidifying the resulting solution to obtain O-acetyl-N-(3,5-dimethylbenzoyl)-heparamine having an acetylation value of 70 to 100%.

9. The process of claim 8 wherein the O-acetyl-N-(3,5-dimethylbenzoyl)-heparamine having an acetylation value of 70 to 100% is reacted with an alkali metal base to form the corresponding salt of O-acetyl-N-(3,5-dimethylbenzoyl)-heparamine having an acetylation value of 70 to 100%.

10. Antilipemic composition comprising a heparamine selected from the group consisting of O-acetyl-N-(3,5-dimethylbenzoyl)-heparamine having an acetylation value of 70 to 100% and its alkali metal salts and a major amount of a physiological carrier.

11. The composition of claim 10 wherein the heparamine is the sodium salt of O-acetyl-N-(3,5-dimethylbenzoyl)-heparamine having an acetylation value of 70 to 100%.

12. Antilipemic composition comprising a heparamine selected from the group consisting of O-acetyl-N-(3,5-dimethylbenzoyl)-heparamine having an acetylation value of 70 to 100% and its alkali metal salts and a major amount of an orally ingestible physiological carrier.

13. The composition of claim 10 containing 20 to 50 mg. of the heparamine compound.

No references cited.

JULIAN S. LEVITT, *Primary Examiner.*

FRANK CACCIAPAGLIA, JR., *Examiner.*